(12) United States Patent
Li

(10) Patent No.: US 6,647,141 B1
(45) Date of Patent: Nov. 11, 2003

(54) USER INTERFACE OF QUERY BY COLOR STATISTICS

(75) Inventor: Zhouning Li, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/443,042

(22) Filed: Nov. 18, 1999

(51) Int. Cl.[7] .............................. G06K 9/00; G06K 9/34
(52) U.S. Cl. ...................... 382/162; 382/168; 382/164; 382/165; 382/170; 382/171
(58) Field of Search ................................. 382/162, 164, 382/165, 167, 168, 170, 171, 172, 173, 305, 251, 190, 205, 195, 220; 358/515, 518, 522, 523, 530; 345/418, 593

(56) References Cited

U.S. PATENT DOCUMENTS

| | | | |
|---|---|---|---|
| 5,179,652 A | | 1/1993 | Rozmanith et al. ......... 395/155 |
| 5,185,857 A | | 2/1993 | Rozmanith et al. ......... 395/148 |
| 5,579,471 A | | 11/1996 | Barber et al. ............... 395/326 |
| 5,596,686 A | | 1/1997 | Duluk, Jr. ................... 395/122 |
| 5,710,877 A | | 1/1998 | Marimont et al. .......... 395/427 |
| 5,751,286 A | | 5/1998 | Barber et al. ............... 345/348 |
| 5,767,893 A | * | 6/1998 | Chen et al. ..................... 348/7 |
| 5,819,288 A | | 10/1998 | De Bonet .................... 707/104 |
| 5,852,823 A | | 12/1998 | De Bonet ....................... 707/6 |
| 5,897,670 A | | 4/1999 | Nielsen ........................ 345/334 |
| 5,926,806 A | | 7/1999 | Marshall et al. ............... 707/3 |
| 6,285,995 B1 | * | 9/2001 | Abdel-Mottaleb et al. ..... 707/3 |
| 6,373,979 B1 | * | 4/2002 | Wang .......................... 382/165 |
| 6,445,818 B1 | * | 9/2002 | Kim et al. ................... 382/165 |
| 6,445,834 B1 | * | 9/2002 | Rising, III .................. 382/305 |

OTHER PUBLICATIONS

Deng et al. (IEEE 0–7803–5041–3/99).*
John R. Smith, Shih–Fu Chang, "VisualSEEk: a fully automated content–based image query system", 1996 ACM 0–89791–871–1/96/11, p. 87–98.
Klara Kedem, Yana Yarmovski, "Curve based stereo matching using the minimum Hausdorff distance", 1996 ACM 0–89791–804–5/96/05, p. C–15–C–18.
Xia Wan, C.–C. Jay Kuo, "A New Approach to Image Retrieval with Hierarchical Color Clustering", IEEE Transactions on Circuits and Systems for Video Technology, vol. 8, No. 5, Sep. 1998, p. 628–643.
Jonathan Ashley, Myron Flickner, James Hafner, Denis Lee, Wayne Niblack, Dragutin Petkovic, "The Query By Image Content (QBIC) System", 1995 ACM 0–89791–731–6/950005, p. 475.
Wen–Syan Li, K. Selcuk Candan, Kyoji Hirata, Yoshinori Hara, "SEMCOG: An Object–based Image Retrieval System and Its Visual Query Interface", 1997 ACM 0–89791–911–4/97/0005, p. 521–524.
Nina Amenta, "Bounded boxes, Hausdorff distance, and a new proof of an interesting Helly–type theorem", 1994 ACM 0–89791–648–4/94/0006, p. 340–347.
Qin He, "Comparison of Content–based Image Retrieval Systems", Graduate School of Library and Information Science, University of Illinois at Urbana–Champaign, Spring, 1996, 11 pages.

* cited by examiner

Primary Examiner—Phuoc Tran
Assistant Examiner—Amir Alavi
(74) Attorney, Agent, or Firm—Blakely, Sokoloff, Taylor & Zafman LLP

(57) ABSTRACT

A system and method for manipulating a histogram to perform query by color statistics are described. In one embodiment, color elements of an object based upon a color space are quantized and a histogram is created from the color elements. Further, the histogram is manipulated and displayed. In one embodiment, a database of images is queried by comparing the edited histogram with at least one existing histogram maintained in the database and at least one image corresponding to the at least one existing histogram is displayed.

38 Claims, 15 Drawing Sheets

(10 of 15 Drawing Sheet(s) Filed in Color)

USER INTERFACE OF QUERY BY COLOR STATISTICS

FIELD OF THE INVENTION

The present invention relates to the display of color spaces. More specifically, the present invention relates to the manipulation of color histograms representing digital images to query by color statistics.

BACKGROUND

Conventional computer systems have been employed to analyze visual images. These visual images include, for example, photographic stills, digitally rendered graphics, video clips, and any other monochrome or color images suitable for representation on a digital system. A goal of these image analysis or image processing systems is to generate information about the characteristics of an image so the image may be classified and used to query an image database.

Image processing techniques include many methods for extracting characteristics or features from an image. For example, techniques are known for extracting color, texture, and component shape characteristics of a given image. Known techniques for extracting the color features of an image typically employ one of two methods. First, the user may select a desired color that may be used as a basis for an image color query. Typically the user selects a color from a palette of image characteristics (colors) selections represented by thumbnail icons corresponding to image colors, such as, for example, as shown in FIG. 1, in order to request a particular image query. The selected image colors are submitted to a query by image content engine. Images are matched to the selected color based on the average color of the matched image over the entirety of the image. A second known image color analysis technique determines not only the overall color of a desired image, but also the percentage coverage of that color and the compactness of the color coverage in a desired image. The percentage color coverage and color compactness are used as additional query conditions in these systems.

Other analysis techniques are known for extracting texture features of an image. Texture features such as granularity, directionality, and tiling features of a given image may be extracted using known techniques.

Still other techniques are known for classifying an image based on structure features, which represent shapes found in the image. Using these known techniques, predefined shapes, such as rectangular, triangular, or circular shapes among others, may be compared to an image to determine the presence of such shapes in the image. This technique may be used to query an image database for images having a particular specified shape.

Color is still the most intuitive and straight forward feature utilized by humans for visual recognition and discrimination of images. The term "color" is often defined by such common terms as hue, saturation (also referred to as chroma), and value (also referred to as intensity or luminance) that are used to represent particular color space. A color space is merely a representation of the different colors or color elements which comprise the respective color systems.

Typically, each color space (or color gamut) is comprised of three elements which define the color space. The three elements constituting the color space define the physical color space representation. Accordingly, there are a number of different theoretical physical, three-dimensional color space representations (e.g., cubes, cones, etc.) for each individual color space. For example, an RGB (red, green, and blue) color space may be theoretically represented as a cube, commonly referred to as an RGB cube. Likewise, an HSV (hue, saturation, and value) color space may be theoretically represented as a hexagonal cone, commonly referred to as an HSV hexcone. The existing user interfaces for query by color statistics as described above offer limited functionality. For example, in methods and systems allowing a user to choose a fixed palette, the user may select a value for each of the values of the color space being utilized. In actual images, palettes vary with subject matter, lighting and other factors and the number of colors needed to describe an object is usually quite large. Furthermore, the user may not be able to guess correctly what colors are within an object. For example, we typically think of an apple as red, but the red component of the apple may also have green, blue and yellow color components within the apple rendition. Thus, we may see red, however, the color is made up of a variety of colors to arrive at the overall red color. Each component within a color space also has a continuous range of colors which makes it more difficult for a user to give a percentage of his chosen color. In addition, in using the RGB color space, each color defined by the color space have a component of red, green and blue within the color.

A color histogram may provide a convenient graphical interface to the retrieval of images that are similar in overall color content and provides a definition of the color representation of an image. The color histogram of an image describes its color distribution. Every pixel in the image corresponds to a point in a three-dimensional color space in which a similar image set may be selected based on the color distribution $$\{T|\text{dist}(H_Q, H_T) < \epsilon\}$$

where $H_Q$ and $H_T$ are color histograms of the query and target images, respectively. If a pixel is described by RGB color components of n bits each, then $H_Q$ and $H_T$ are defined on the cubic lattice of $2^n \times 2^n \times 2^n$ points. However, to simplify the computation of the query, the color space may be quantized to reduce the resolution of both histograms.

SUMMARY OF THE INVENTION

A system and method for manipulating a histogram to perform query by color statistics are described. In one embodiment, color elements of an object based upon a color space are quantized and a histogram is created from the color elements. Further, the histogram is manipulated and displayed. In one embodiment, a database of images is queried by comparing the edited histogram with at least one existing histogram maintained in the database and at least one image corresponding to the at least one existing histogram is displayed.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The objects, features and advantages of the present invention will be apparent to one skilled in the art in light of the following detailed description in which:

FIG. 4b illustrates an exemplary window for displaying color settings for the dialog box of FIG. 4a;

FIG. 5a illustrates an exemplary window for dialog box for a display group box within the history edit dialog window of FIG. 4a;

FIG. 6 illustrates an exemplary window for displaying the history dialog of FIG. 4a;

DETAILED DESCRIPTION

Figure 1:
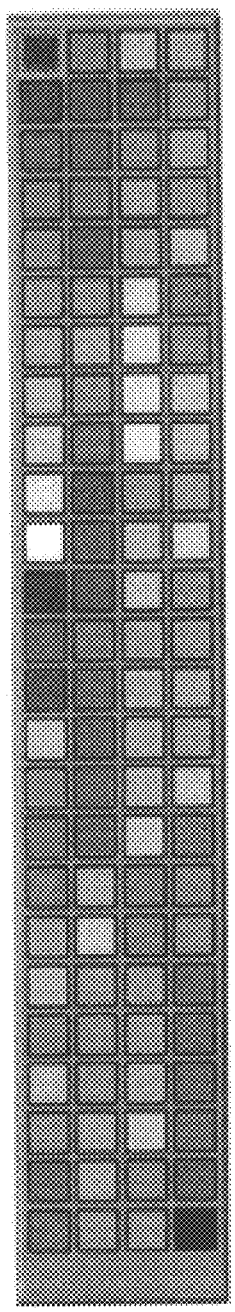
FIG. 1 is an example of a discrete color palette.

A system and method for manipulating a histogram to perform query by color statistics are described. In one embodiment, color elements of an object based upon a color space are quantized and a histogram is created from the color elements. Further, the histogram is manipulated and displayed. In one embodiment, a database of images is queried by comparing the edited histogram with at least one existing histogram maintained in the database and at least one image corresponding to the at least one existing histogram is displayed.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Although the following description describes one embodiment in terms of an HSV color space, it is understood that the HSV color space is merely representative of one embodiment of one type of color space in which the present invention may be described. It is further understood that the inventive aspects of the present invention are not to be limited to such color space, but rather the inventive aspects of the present invention may be applied to a variety of different color spaces, such as, for example, RBG, YcrCb, CIExyY, CIELAB, and other color spaces.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
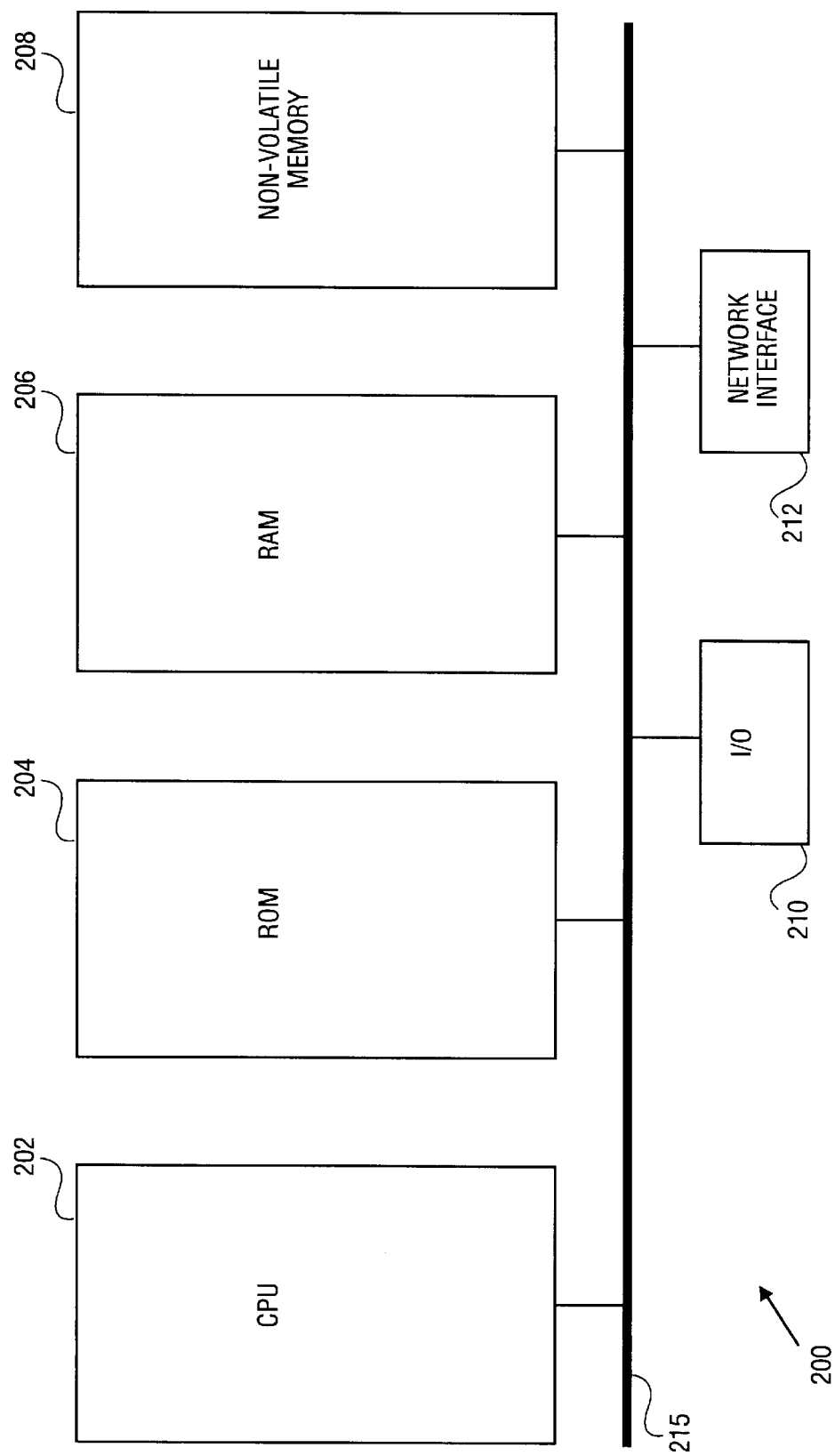
FIG. 2 is a block diagram of one embodiment for an architecture of a computer system.

FIG. 2 is a block diagram of one embodiment for an architecture for computer system 200. Referring to FIG. 2, CPU 202 is coupled via bus 215 to a variety of memory structures and input/output 210. The memory structures may include read only memory (ROM) 204, random access memory (RAM) 206, and/or non-volatile memory 208. In one embodiment, CPU 202 is also coupled via bus 215 to a network interface 212. Network interface 202 may be used to communicate between computer system 200 and a remote server and a variety of other computer terminals (not shown). The network interface 212 is coupled to the wide area network by any of a variety of means such as, for example, a telephone connection via modem, a DSL line, or the like.

Figure 3A:
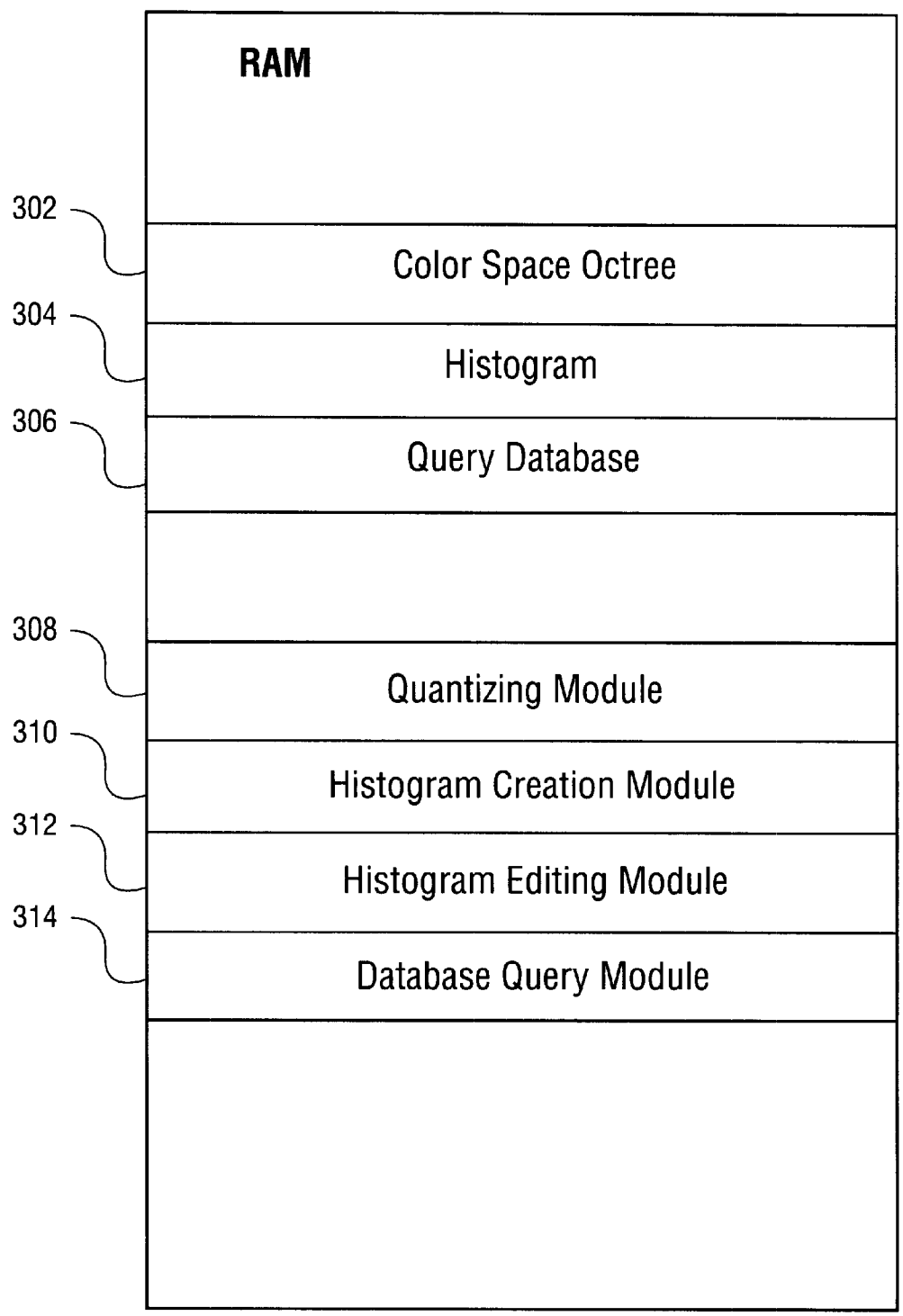
FIG. 3a is a block diagram of one embodiment for random access memory, such as that shown in FIG. 2.

FIG. 3a is a block diagram of one embodiment for random access memory (RAM) 206 of FIG. 2. Referring to FIG. 3a, RAM 206 contains histogram octree 302, histogram 304, and query database 306. In addition, RAM 206 contains quantizing module 308, histogram creation module 310, histogram editing module 312, and database query module 314.

Histogram octree 302 is used to maintain an octree data structure as it is being created and manipulated by one embodiment. Histogram 304 is used to store histogram data of a selected image, and query database 306 is used to maintain the database of images used by the embodiments of the present invention.

Quantizing module 308 is configured to quantize color elements of a selected image based upon a color space. Histogram creation module 310 is configured to create a histogram from the color elements of the selected image. Histogram editing module is configured to manipulate the histogram and display the manipulated histogram on I/O 210. Database query module 314 is configured to query database 306 by comparing the edited histogram 304 with at least one existing histogram maintained in database 306, and configured to display images from database 306 that match histogram 304 within a threshold limit.

Figure 3B:
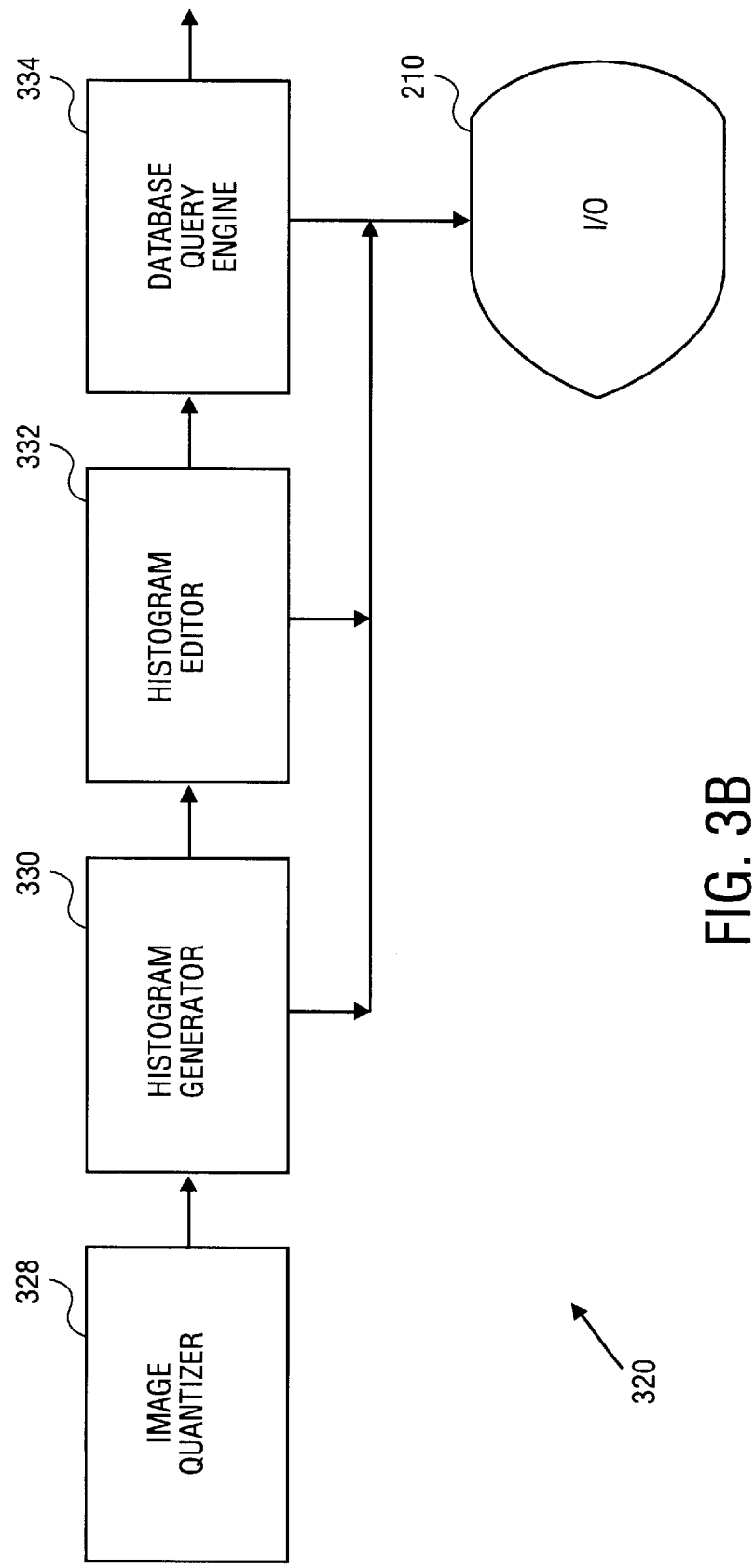
FIG. 3b is a block diagram illustrating one embodiment of a query by color statistics system.

FIG. 3b is a block diagram illustrating one embodiment of a query by color statistics system 320. Referring to FIG. 3b, image quantizer 328 is configured to quantize color elements of an image based upon a selected color space. In one embodiment, the user may select an RGB, HSV, or CIELAB color space. The quantized image data is used by histogram generator 330 to create the color space octree 302 and the histogram for the selected image. The histogram may be displayed on I/O 210 as it is being generated or stored in histogram 304 and displayed after the entire histogram is generated. Histogram generator 330 is configured to create the histogram from the color elements and to generate a color space octree corresponding to the color elements. In addition, histogram generator 330 is configured to parse the color elements of the quantized image onto the octree based upon the color space. As described in detail below, in one embodiment, the first color elements of the image are parsed onto a first level of the octree, second color elements of the image are parsed onto a second level of the octree, and third color elements of the image are parsed onto a third level of the octree. For the HSV color space, hue elements are parsed onto the first level, luminance elements are parsed onto the second level, and saturation elements are parsed onto the third level. In addition, histogram generator 330 is configured to prune the octree to remove nodes.

Histogram editor 332 is configured to manipulate the histogram displayed on I/O 210 and the octree representing the histogram data. Histogram editor 332 displays the manipulated histogram on I/O 210. The user may use histogram editor 332 to select a color range from a palette, display the color range as a second histogram, select at least one color from the second histogram, and add the selected colors to the first histogram. In addition, the user may use histogram editor 332 to select a color by choosing its color elements, and add the color to the first histogram. Alternatively, the user may use histogram editor 332 to select a color from the first histogram and delete the selected color from the first histogram.

Referring again to FIG. 3b, once the user is satisfied that the colors within histogram 302 are correct, the user may submit the histogram to database query engine 334. Database query engine 334 queries query database 306 by comparing the edited first histogram with existing histograms maintained in query database 306. Database query engine 334 displays the images corresponding to the existing histograms on I/O 210.

Figure 4A:
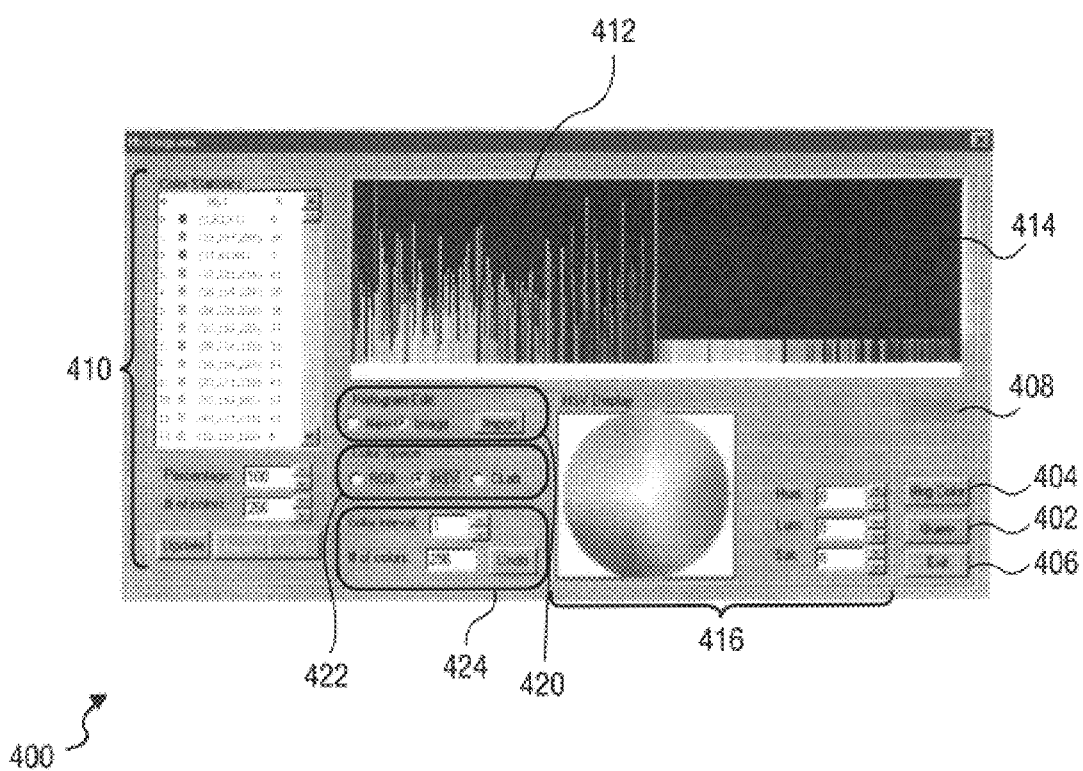
FIG. 4a illustrates an exemplary histogram editing display window for the integrated computer system of FIG. 1.

FIG. 4a illustrates an exemplary histogram editing display window 400. Referring to FIG. 4a, display 400 contains color settings window 410, left histogram window 412, right histogram window 414, color space display dialog box 416, histogram edit group box 420, color space selection box 422, and palette setting group box 424. In the example illustrated, the user sets the display of color space dialog box 416 by selecting the appropriate button in color space selection box 422. In the example shown, the HSV color space has been selected and the HSV display is shown in color space display dialog box 416.

In one embodiment, the user may initialize the histogram editing display window 400 by selecting an existing image file or creating a new histogram. In this embodiment, the user selects which of the two alternatives to use by selecting the appropriate radio button in histogram edit group box 420. In the example shown, the existing image file alternative has been selected. Once the user selects the image button, the user clicks on the import button within histogram edit group box 420. In one embodiment, this may result in a pop-up window (not shown) occurring over the editing display 400 to select the appropriate image. In an alternate embodiment, a separate application window (not shown) may be displayed for image selection.

In one embodiment, three color spaces are available in color space selection box 422. In this embodiment, the user may select between HSV, CIELAB, and RGB color spaces. The user may also determine the number of color intervals and the total number of colors to be displayed in left histogram window 412 by selecting the appropriate values in palette setting group box 424. In the example shown, 256 colors have been selected with a "color interval" of one. The "color interval" and/or "# of colors" determines the number of colors displayed on the screen. For example, if the user wants to display a palette in RGB color space from color (0,0,0) to color (255,255,255), which selects colors from black to white, and the user enters 8 in the interval box, every eighth color within the range from 0 to 255 will be displayed. The total number of colors displayed in this example would be 256/8=32. Thus, 32 colors will be shown in the "# of colors" edit box. Alternatively, the user may select the total number of colors to be displayed within the "# of colors" edit box.

Figure 4B:
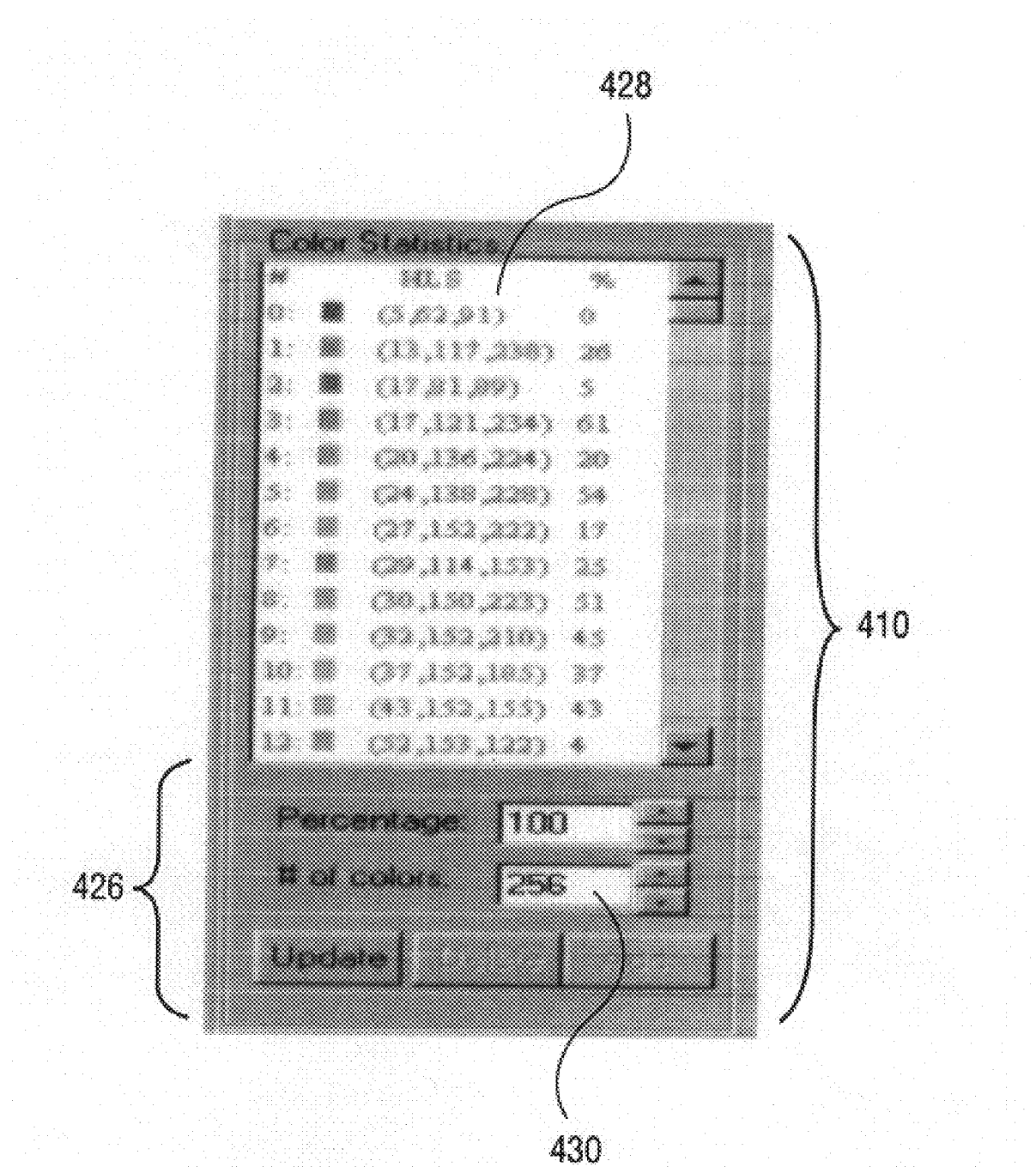

FIG. 4b illustrates an exemplary color setting window 410 of histogram editing display window 400. Referring to FIG. 4b, color setting window 410 displays the color statistics of the selected image in list box 428. Within list box 428, all the colors contained in the histogram shown in left histogram window 412 are listed. In the example shown, each listing comprises a reference number, a thumbnail showing the actual color, the color components of the color for the specified color space (HSV in the example), and the percentage of the color within the image. Color setting window 410 also contains percentage edit box 426. From within percentage edit box 426, the user may edit any selected color by percentage. Thus, by selecting, for example, color number 3 from list box 428 (by highlighting or clicking on the entry within list box 428), the user may increase or decrease the percentage of the selected color within the histogram from the original percentage. Color setting window 410 also includes a "# of colors" list box 430 for displaying the total number colors in list box 428. This number of colors may or may not correspond to the number of colors within the palette settings group box 424.

Figure 5A:
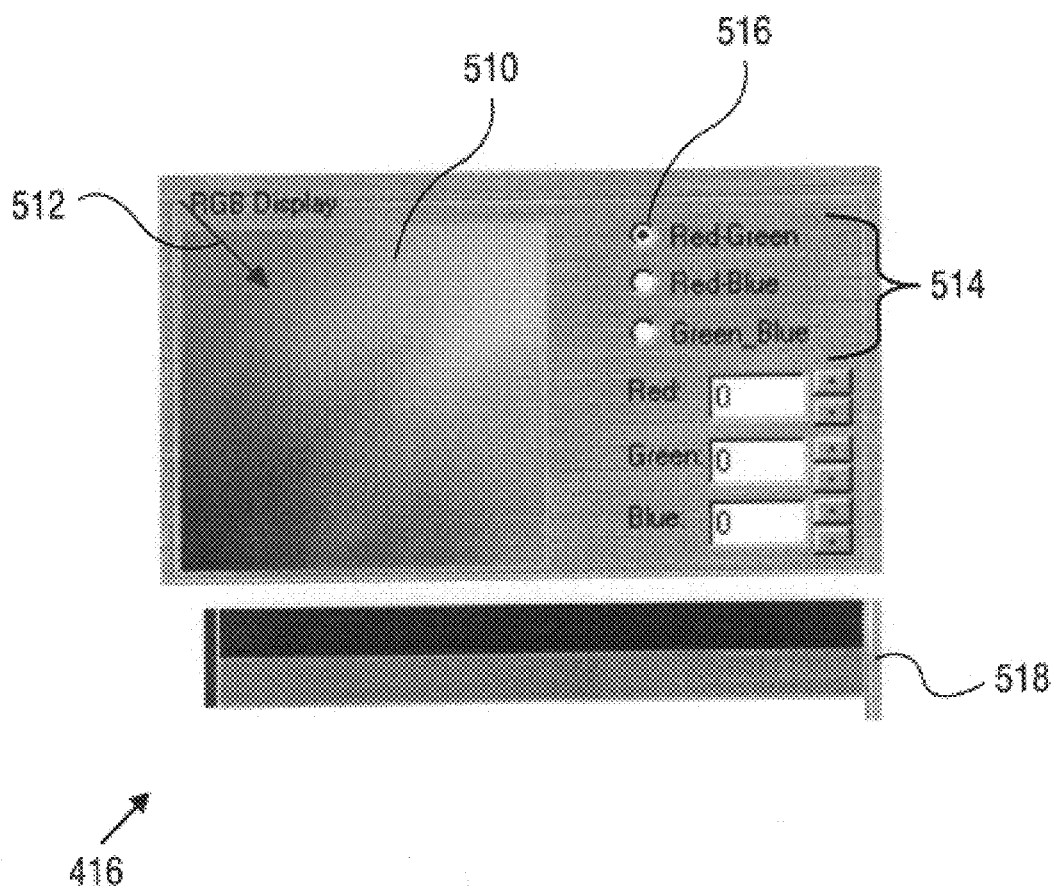

FIG. 5a illustrates an exemplary color space display dialog box 416. Referring to FIG. 5a, display dialog box 416 is shown for the RGB color space. For this color space, there are three, two-dimensional palettes shown depending on the radio button 514 selected. For example, if the Red-Green radio button 516 is selected as shown in the example, the Red-Green palette will be generated within palette display area 510. This selection displays the value of the red component from 0 to 255 along the vertical axis, the value of the green component from 0 to 255 along the horizontal axis, and the blue component is maintained at 0. The user may choose any color to add to histogram 304 by clicking the appropriate position in the palette display area 510. For example, if the user's cursor is the arrow 512, a continuous palette will be generated in display 518 for the selection. The red and green components will remain constant and blue will vary from 0 to 255. Thus, a point 512 within palette display area 510 is chosen that has a red value from 0 to 255 and a green value from 0 to 255. A continuous palette will be displayed in display 518 in which the blue value will vary from 0 to 255 for the chosen red and green value. The palette selected will be displayed in right histogram window 414.

Figure 5B:
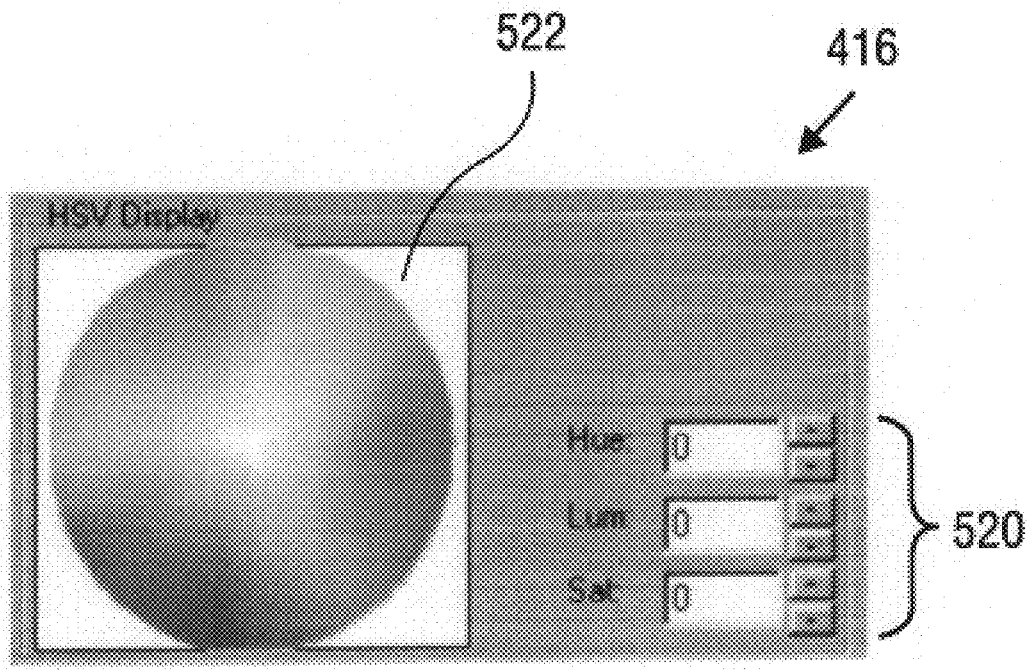
FIG. 5b illustrates an alternate exemplary window for the dialog box.

FIG. 5*b* illustrates another exemplary color space display dialog box 416. Referring to FIG. 5*b*, the color space display dialog box 416 is shown for the HSV color space. Within the HSV palette, entry boxes 520 allow the user to enter the appropriate hue, luminance and saturation levels for a given color. The levels range from 0 to 360°. The radius of display 522 represents the saturation which is from 0 to 255. In the example shown, the value of luminance is at the maximum of 255. Display 522 is a two-dimensional representation of a three-dimensional HSV display in which the vertical axis is the luminance. In the FIG. 5*b* example, luminance is held constant at 255 and the H and S components vary depending upon the location within the circle.

Figure 6:
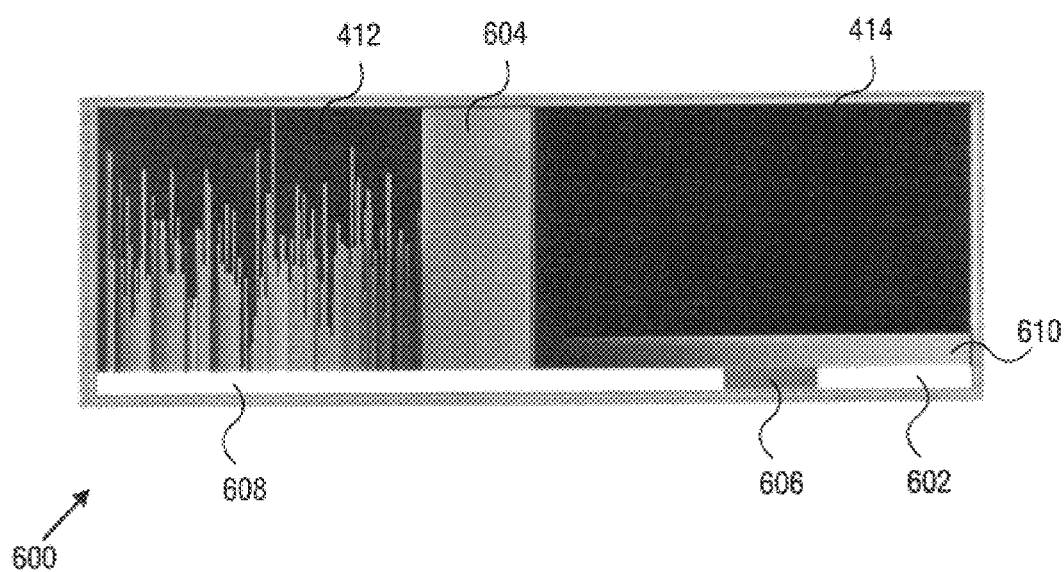

FIG. 6 illustrates an exemplary histogram dialog window 600. Histogram dialog window 600 contains left histogram window 412 and right histogram window 414. Left histogram window 412 displays the histogram 304 of a selected image. Alternatively, left histogram window 412 shows a composite histogram 304 developed by adding a number of colors to the histogram by the user. The histogram displayed within left histogram window 412 may be generated by importing an image, by adding colors from right histogram window 414, or both. Within histogram dialog window 600, colors may be added, deleted, or adjusted. In one embodiment, colors may be adjusted by percentage. Right histogram window 414 displays a continuous palette 610 of a selected color. The selection may be generated by the user entering information in palette setting group box 424 or by selecting background color box 408 as shown in FIG. 4*a*. Within right histogram window 414, the user may select a range of colors by using a mouse to select within slide bar 602. In the example shown, the user has selected area 606. Once the user selects the area and clicks on an add button, the colors selected in right histogram window 414 are added to the histogram within left histogram window 412 as shown at 604.

In a similar manner, the user may delete colors within left histogram window 412 by making an appropriate selection in the slide bar area 608 and clicking on a delete button. In one embodiment, the add and delete buttons will pop up immediately upon a right click of the selected slide bar area (not shown). In an alternate embodiment, add and delete buttons will be displayed on histogram editing display window 400 menu (not shown).

Figure 7:
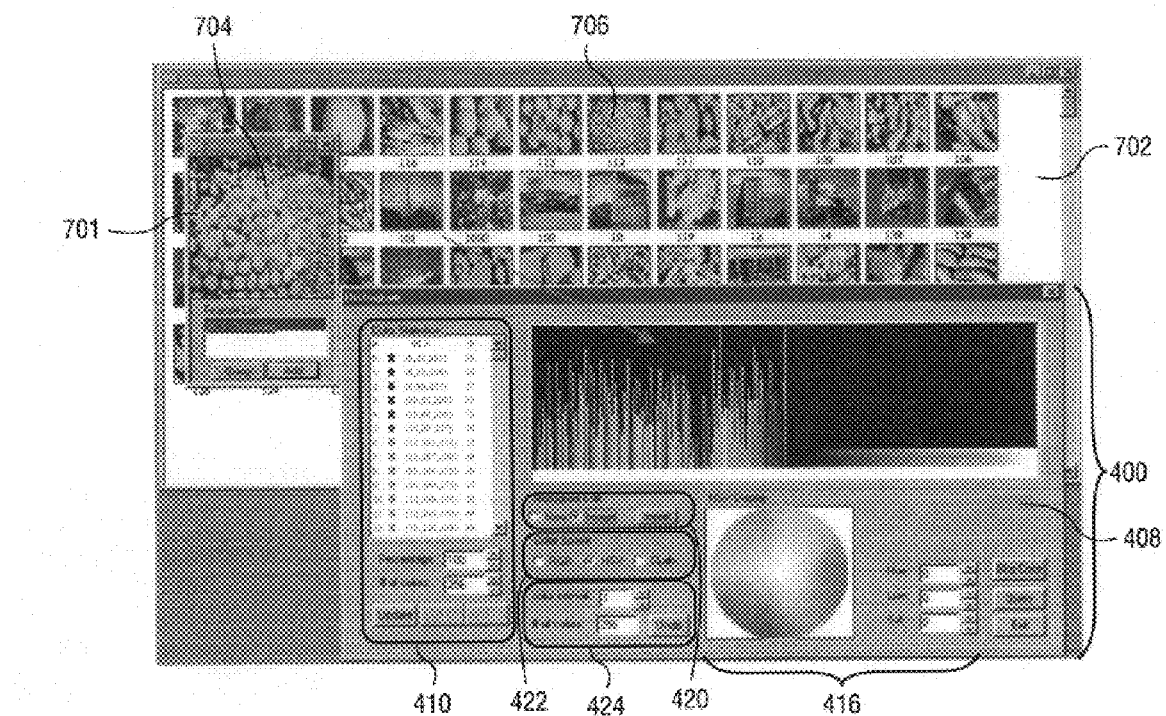
FIG. 7 is an exemplary window for displaying the histogram of a selected image file.

FIG. 7 illustrates an example of a histogram editing session. Referring to FIG. 7, a user, in one embodiment, may select an image 706 from an image display area 702. Once the image 706 is selected, it is displayed within pop-up window 704. Image display area 702 may be displayed by the user clicking on the image button within histogram edit group box 420. By an alternate method, the user may select the image 706 from an open image display area 702 by double-clicking on the image. In the example shown, the data shown within histogram editing display 400 represents the image 706 selected and shown within pop-up window 704. Once image 706 is selected, the color histogram representing the colors of the selected image 706 is displayed in left histogram window 412. In addition, the background color or base color of the image 706 is shown within background color box 408. In one embodiment, the base color is the color with the highest percentage within image 706. The histogram displayed within left histogram window 412 is dependent upon the color space selected in color space selection box 422. In the example shown, the HSV color space has been selected. Color settings window 410 displays the colors, the percentages of hue, saturation, and luminance, and the percentage of a selected color within image 706. In one embodiment, the default percentage is for the base color. In an alternate embodiment, the default percentage is 100%, representing all the colors in the histogram.

Figure 8:
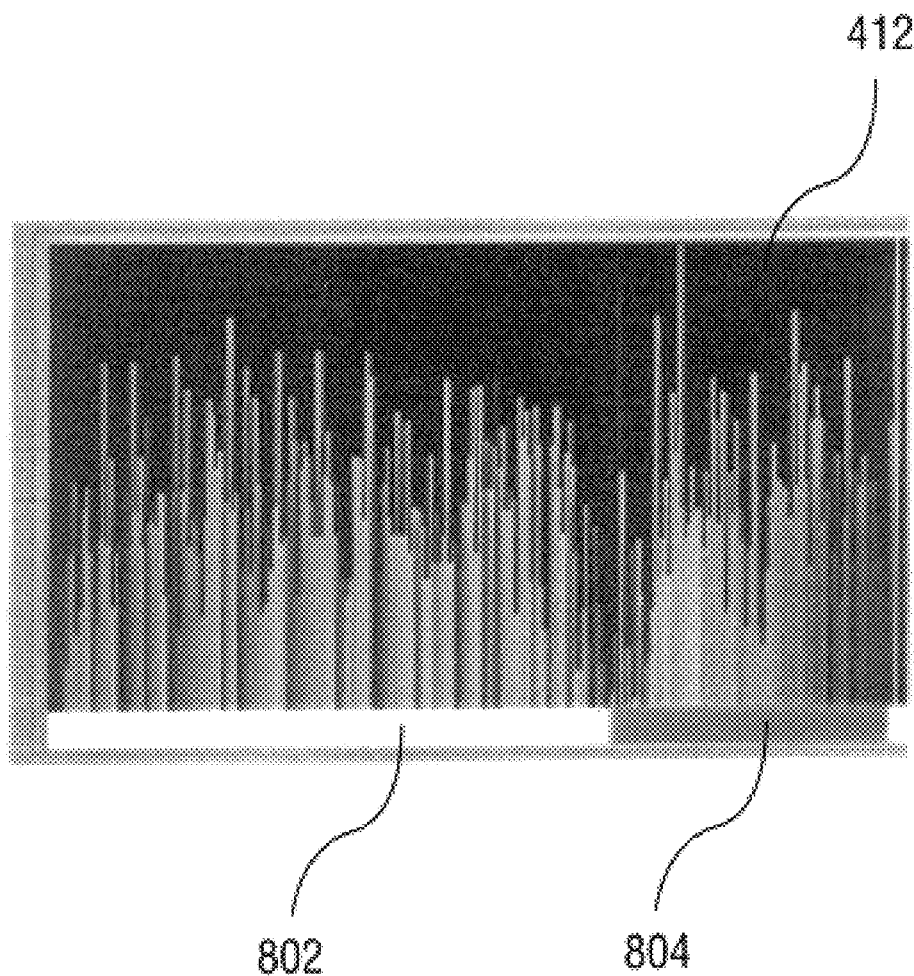
FIG. 8 is an exemplary display window for displaying the histogram with a selection of all green color within the histogram.

FIG. 8 illustrates an exemplary left histogram window 412 for the example of FIG. 7. Referring to FIG. 8, the histogram colors have been selected in slide bar 802. In this example, all green color has been selected at area 804 within the histogram. Once area 804 is selected, the user may delete all the colors above the selection area 804 from the histogram by selecting the appropriate delete button (not shown). After the user deletes the colors, the histogram will be updated and display all colors except for those selected and deleted.

Figure 9:
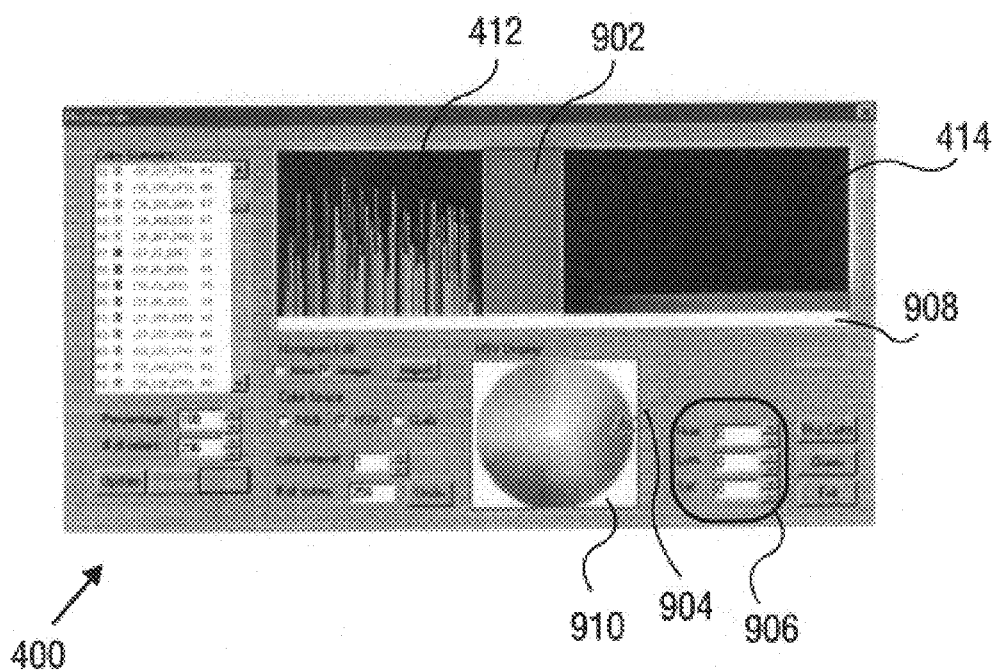
FIG. 9 is an exemplary window for displaying the addition of color to a histogram.

FIG. 9 illustrates an exemplary histogram editing display window 400 showing the addition of red color to the histogram. In this example, the user has selected a color range from the two dimensional HSV color palette as shown by the green arrow 904. By using the cursor to point and then clicking on the area, the palette for the selected color will be displayed in right histogram window 414. Alternatively, the user may select an individual color by entering the color's hue, saturation, and luminance values in the appropriate boxes 906. The user may then select an area within the status slide bar 908 of right histogram window 414 and add the colors selected to left histogram window 412 as shown at 902. In one embodiment, the entire spectrum shown in right histogram window 414 is added to the histogram at 902 when a color is selected in HSV palette area 910.

Figure 10:
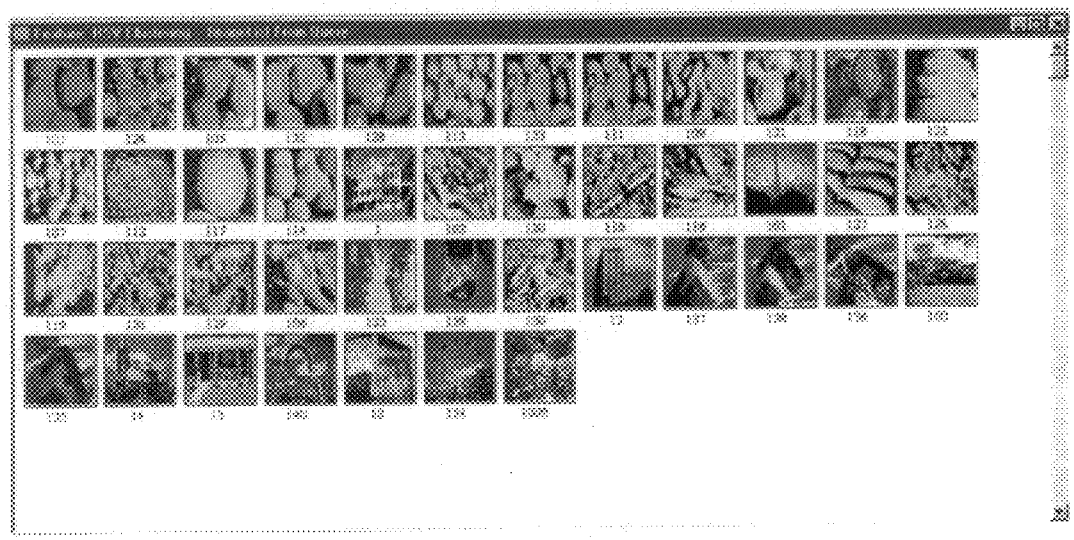
FIG. 10 is an exemplary window displaying the results of a query based on a histogram.

FIG. 10 illustrates an exemplary query result based on the histogram of FIG. 9. Referring to FIG. 10, once the user is satisfied that the colors selected within left histogram window 412 are those colors and range of colors that the user wishes to query the database for, the user may click on query button 402. Once the user clicks on the query button 402, the query engine uses the color statistics represented by the histogram shown in left histogram window 412 and compares the color statistics of the histogram of left histogram window 402 with the color statistics of the images within image query database 306. In one embodiment, the color statistics are stored as an octree in color space octree 302 and the query engine compares the octrees of the images. If the image octrees are similar, then the images are displayed. A detailed description of the query engine is described in patent application Ser. No. 09/175,155, U.S. Pat. No. 6,445,834 B1, entitled "Modular Image Query System," which is assigned to the same assignee as the present application. The images will be displayed within the query results page of FIG. 10. In one embodiment, the default order of display will be based on the similarity of the octrees 302.

Figure 11:
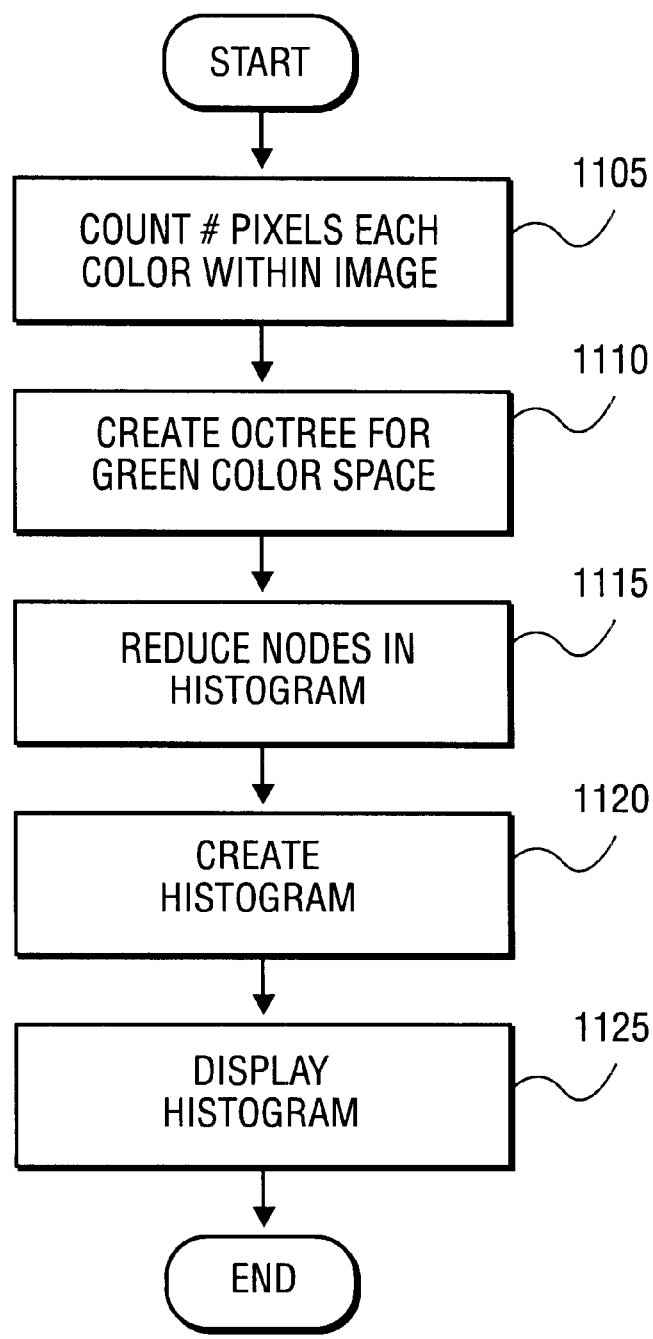
FIG. 11 is a flow diagram of one embodiment for creating histograms.

FIG. 11 is a flow diagram of one embodiment for creating histogram 304. Initially at processing block 1105, a number of pixels for each color within a selected image is counted. After the number of pixels for each color are counted, a color space octree 302 of the image for the selected color space is created at processing block 1110. At processing block 1110, a determination is first made as to which color space has been selected by the user. In one embodiment, only HSV and CIELAB color spaces are supported by the system. In alternate embodiments, any of a variety of color spaces, such as, for example, RGB color space, may also be supported. In one embodiment, the HSV color space is used to create a color space octree 302 of the colors within the image.

Initially, a root is generated for the octree 302. Octree 302 for the HSV color space is defined as follows: the first level of octree 302 represents the hue component of the color elements, the second level, or the children of level one, represent the luminance component of the color elements, and the third level, or the children of level two, represent the saturation component of the color elements. At the first level of the tree, the eight children of the root correspond to the eight subspaces of the entire space. Similarly, each of the eight nodes may have its own eight children corresponding to further divided subspaces. Each color space component varies from 0 to 255 in which the maximum intensity is 255. Each node's value is between 0 and 255. Each node's value is quantized to 256 in which 256/8=32. Each color in the image defines a path from the root to the leaf of octree 302. Each pixel of a selected image is scanned and inserted into octree 302. In one embodiment, each color element will be quantized by 256.

The distance from the root (the quantization factor or the weight of the node) for each node is as follows:

$$D = \text{level-1-node} \times 256^2 + \text{level-2-node} \times 256 + \text{level-3-node}$$

Each of the nodes is quantized according to this factor. The color space is comprised of individual color elements which have been quantized into a series of different color points (the leaves of octree 302). Thus, each color point, associated with the HSV color, is described by the weight, which represents its distance from the root in octree 302, and its HSV component parts, which corresponds to a specific location within the HSV color space. By creating octree 302 in this manner, leaves of octree 302 that are close to one another are similar in color. The octree 302 may define a represented color in the color space. An advantage of creating octree 302 in this manner is that color components that are similar to one another are close together in octree 302 and may be merged easily. In addition, a histogram created from octree 302 will display like colors together within left histogram window 412. Other color space models may also be represented using octree 302.

After octree 302 is created, the number of nodes in octree 302 are pruned or reduced at processing block 1115. In one embodiment, the number of nodes is pruned by creating a set number of bins. Within each bin, the number of nodes is pruned until the number of nodes within each bin is a consistent number. In an alternate embodiment, the nodes are pruned by determining a threshold of difference between two adjacent nodes. If two nodes have a distance less than the threshold, the two nodes will be merged into a single node. The node pruning methods will be described in more detail below.

After the nodes are pruned, the histogram is created at processing block 1120. The histogram is created by traversing the pruned octree 302 at the leaves. For each leaf, the appropriate hue, saturation, and luminance (which defines the color in the HSV color space) is determined by traversing to the root of octree 302 and the appropriate histogram entry for the color is created. As the entry is being created, the histogram is displayed within left histogram window 412 at processing block 1125. By traversing octree 302 in order, the histogram created displays like colors together within left histogram window 412. For example, all "yellow" colors will be displayed close together and all "red" colors will also be displayed together.

In one embodiment, a modified Hausdorf distance method is used to prune the number of nodes in octree 302 which produces bins of similar colors in which each bin contains a consistent number of nodes. In uniform quantization, each axis of the color space (hue, luminance, and saturation in HSV color space) is uniformly divided into a certain number of bins. This pruning of nodes within octree 302 may be necessary to reduce the number of colors represented by the histogram such as, for example, to reduce the number of colors from 256 to 128. This reduction allows the bins to be more manageable without a noticeable loss in query matching accuracy.

The modified Hausdorf method compares the distance between two sets of points A and B in which $a_i$ is a point in set A and $b_i$ is a point in set B. A is the set of elements in which the sets of elements $(a_1, a_2, \ldots a_i \ldots a_n)$ and B is the set of elements $(b_1, b_2 \ldots b_i \ldots b_n)$. The raw distance between $a_i$ and $b_i$ is defined as:

$$d(a_i, b_i) = fr |a_i - b_i|$$

where $$fr = \frac{a_i - weight}{b_i - weight} \text{ if } fr < 1$$

$$fr = \frac{1}{fr}$$

in which weight represents the distance for the element from the root node.

The distance between point $a_i$ and the set B is:

$$d(a_i, B) = \min_{b_i \in B} d(a_i, b_i).$$

The distance between point $b_i$ and the set A is:

$$d(A, b_i) = \min_{a_i \in A} d(a_i, b_i).$$

The Hausdorf distance between points $a_i$ and $b_i$ is defined as:

$$D_{\text{avg\_min}} = \frac{\sum_{a_i \in A}^{n} d(a_i, B) + \sum_{b_i \in B}^{n} d(A, b_i)}{n + m}.$$

Each axis of the color space is uniformly divided into a certain number of bins m. If $a_i$ falls within a specified average distance, $D_{avg\_min}$, of the center of the bin, then $a_i$ is merged into the bin.

$D_{avg\_min}$ is the distance between the two maps A and B.

Figure 12:
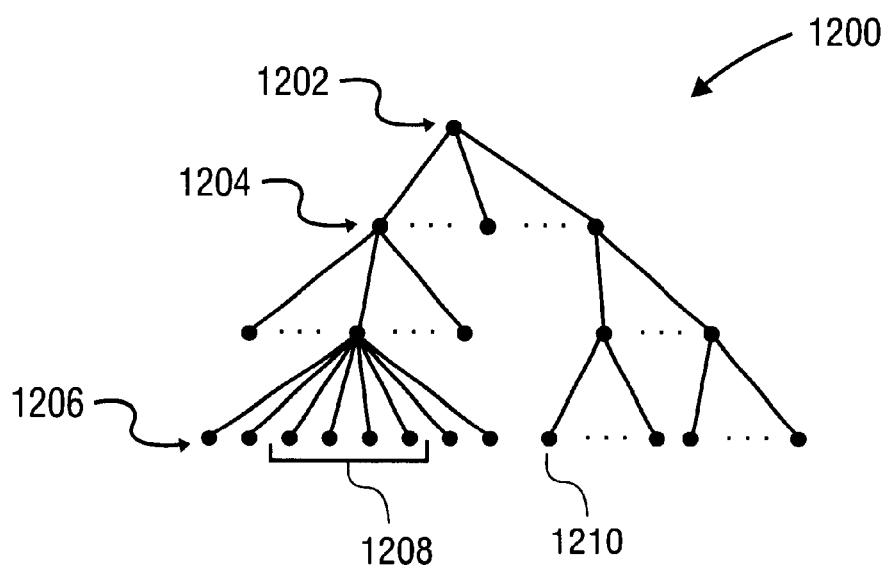
FIG. 12 is an example of a histogram octree.

This translates the set A so as to bring each element of A as close to an element of B as possible. If the distance of an element is within a threshold distance, then the element is merged with the set B elements, thus reducing the number of nodes in the tree. This removes or combines leaves that are next to each other in octree 302. Referring to FIG. 12, leaves 1208 are close to one another in the tree and leave 1210 is some distance from the leaves 1208. If, during application of the modified Hausdorf method, leaves 1208 are within the threshold distances of a set bin value, then leaves 1208 will be combined into a single leaf. If the distance from leaves 1208 to leaf 1210 is above the threshold value, then leaf 1210 will not be combined with leaves 1208 but will be quantized into another bin.

In an alternate embodiment, an HSV color space distance measurement may be used. Using the same sets of elements as above, each element consists of weight (distance from the octree root), hue, luminance, and saturation as follows: {weight, hue, lum, sat}.

The following averages are computed:

$$\overline{A}_{hue} = \frac{\sum_i^n a_{i\_hue} \times a_{i\_weight}}{\sum_i^n a_{i\_weight}}$$

$$\overline{A}_{lum} = \frac{\sum_i^n a_{i\_lum} \times a_{i\_weight}}{\sum_i^n a_{i\_weight}}$$

$$\overline{A}_{sat} = \frac{\sum_i^n a_{i\_sat} \times a_{i\_weight}}{\sum_i^n a_{i\_weight}}$$

$$\overline{B}_{hue} = \frac{\sum_i^m b_{i\_hue} \times b_{i\_weight}}{\sum_i^m b_{i\_weight}}$$

$$\overline{B}_{lum} = \frac{\sum_i^m b_{i\_lum} \times b_{i\_weight}}{\sum_i^m b_{i\_weight}}$$

$$\overline{B}_{sat} = \frac{\sum_i^m b_{i\_sat} \times b_{i\_weight}}{\sum_i^m b_{i\_weight}}$$

The HSV measurement uses the following constants:

fa=3.1415/180 normal=$\sqrt{5} \times 255$

The following factors are calculated:

dis_lum=$(\overline{A}_{lum}-\overline{B}_{lum})^2$ $A_{cos}=\cos(\overline{A}_{hue}*\text{fa})$, $A_{sin}=\sin(\overline{A}_{hue}*\text{fa})$ $B_{cos}=\cos(\overline{B}_{hue}*\text{fa})$, $B_{sin}=\sin(\overline{B}_{hue}*\text{fa})$ dis_cos=$(\overline{A}_{sat} \times A_{cos} - \overline{B}_{sat} \times B_{cos})^2$ dis_sin=$(\overline{A}_{sat} \times A_{sin} - \overline{B}_{sat} \times B_{sin})^2$ The HSV distance is:

$$Dis = \frac{1}{normal}\sqrt{dis\_lum + dis\_cos + dis\_sin}.$$

Dis is the distance, in the HSV color space, between the image being used as a basis and a target image. Thus, the distance measures how alike or unalike the base image and target image are.

The specific arrangements and methods herein are merely illustrative of the principles of this invention. Numerous modifications in form and detail may be made by those skilled in the art without departing from the true spirit and scope of the invention.

What is claimed is:

1. A method of manipulating a histogram, comprising:
   quantizing color elements of an object based upon a color space;
   generating a color space octree corresponding to the color elements, wherein leaves close together in the octree correspond to similar colors;
   creating a first histogram that groups like colors together by traversing the octree at the leaves;
   manipulating the first histogram; and
   displaying the manipulated first histogram.

2. The method of claim 1 further comprising:
   querying a database by comparing the edited first histogram with at least one existing histogram maintained in the database; and
   displaying at least one image corresponding to the at least one existing histogram.

3. The method of claim 1 further comprising:
   parsing color elements of an image onto the octree based upon the color space, wherein first color elements of the image are parsed onto a first level of the octree, second color elements of the image are parsed onto a second level of the octree, and third color elements of the image are parsed onto a third level of the octree.

4. The method of claim 1 further comprising:
   pruning the octree to remove nodes.

5. The method of claim 1 wherein the color space is HSV and hue elements are parsed onto the first level, luminance elements are parsed onto the second level, and saturation elements are parsed onto the third level.

6. The method of claim 1 wherein the color space is selected from the group comprising RGB, HSV, and CIELAB.

7. The method of claim 1 wherein manipulating the first histogram further comprises:
   selecting a color range from a palette;
   displaying the color range as a second histogram;
   selecting at least one color from the second histogram; and
   adding the selected at least one color to the first histogram.

8. The method of claim 1 wherein manipulating the first histogram further comprises:
   selecting a color by choosing its color elements;
   adding the color to the first histogram.

9. The method of claim 1 wherein manipulating the first histogram further comprises:
   selecting at least one color from the first histogram; and
   deleting the selected at least one color from the first histogram.

10. A method of manipulating a histogram comprising:

quantizing color elements of an image file based upon a color space;

generating a color space octree corresponding to the color elements, wherein leaves close together in the octree correspond to similar colors;

creating a histogram that groups like colors together by traversing the octree at the leaves; and displaying the histogram.

11. The method of claim 10 further comprising:

pruning the octree to remove nodes.

12. The method of claim 10 wherein quantizing further comprises:

parsing color elements of an image onto the octree based upon the color space, wherein first color elements of the image are parsed onto a first level of the octree, second color elements of the image are parsed onto a second level of the octree, and third color elements of the image are parsed onto a third level of the octree.

13. The method of claim 12 wherein the color space is HSV and hue elements are parsed onto the first level, luminance elements are parsed onto the second level, and saturation elements are parsed onto the third level.

14. The method of claim 10 wherein the color space is chosen from the group comprising RGB, HSV, and CIELAB.

15. A system for manipulating a histogram, comprising:

means for quantizing color elements of an object based upon a color space;

means for generating a color space octree corresponding to the color elements, wherein leaves close together in the octree correspond to similar colors;

means for creating a first histogram that groups like colors together by traversing the octree at the leaves;

means for manipulating the first histogram; and means for displaying the manipulated first histogram.

16. The system of claim 15 further comprising:

means for querying a database by comparing the edited first histogram with at least one existing histogram maintained in the database; and means for displaying at least one image corresponding to the at least one existing histogram.

17. The system of claim 15 further comprising:

means for pruning the octree to remove nodes.

18. A system of manipulating a histogram comprising:

means for quantizing color elements of an image file based upon a color space;

means for generating a color space octree corresponding to the color elements, wherein leaves close together in the octree correspond to similar colors;

means for creating a histogram that groups like colors together by traversing the octree at the leaves; and means for displaying the histogram.

19. The system of claim 18 further comprising:

means for pruning the octree to remove nodes.

20. An article of manufacture including one or more computer-readable media with executable instructions therein, which, when executed by a processing device causes the processing device to:

quantize color elements of an object based upon a color space;

generate a color space octree corresponding to the color elements, wherein leaves close together in the octree correspond to similar colors;

create a first histogram that groups like colors together by traversing the octree at the leaves;

manipulate the first histogram; and display the manipulated first histogram.

21. The media of claim 20 further comprising:

query a database by comparing the edited first histogram with at least one existing histogram maintained in the database; and display at least one image corresponding to the at least one existing histogram.

22. The media of claim 20 further comprising:

prune the octree to remove nodes.

23. An article of manufacture including one or more computer-readable media with executable instructions therein, which, when executed by a processing device causes the processing device to:

quantize color elements of an image file based upon a color space;

generate a color space octree corresponding to the color elements, wherein leaves close together in the octree correspond to similar colors;

create a histogram that groups like colors together by traversing the octree at the leaves; and display the histogram.

24. The media of claim 23 further comprising:

prune the octree to remove nodes.

25. A system for manipulating a histogram, comprising:

a quantizing module configured to quantize color elements of an object based upon a color space;

a histogram creation module configured to generate a color space octree corresponding to the color elements, wherein leaves close together in the octree correspond to similar colors, and to create a first histogram that groups like colors together by traversing the octree at the leaves; and a histogram editing module configured to manipulate the first histogram and display the manipulated first histogram.

26. The system of claim 25 further comprising:

a database query module configured to query a database by comparing the edited first histogram with at least one existing histogram maintained in the database, and configured to display at least one image corresponding to the at least one existing histogram.

27. The system of claim 25 wherein the histogram creation module is further configured to:

parse color elements of an image onto the octree based upon the color space, wherein first color elements of the image are parsed onto a first level of the octree, second color elements of the image are parsed onto a second level of the octree, and third color elements of the image are parsed onto a third level of the octree.

28. The system of claim 27 wherein the color space is HSV and hue elements are parsed onto the first level, luminance elements are parsed onto the second level, and saturation elements are parsed onto the third level.

29. The system of claim 25 wherein the histogram creation module is further configured to prune the octree to remove nodes.

30. The system of claim 25 wherein the color space is chosen from the group comprising RGB, HSV, and CIELAB.

31. The system of claim 25 wherein the histogram editing module is further configured to:
   select a color range from a palette;
   display the color range as a second histogram;
   select at least one color from the second histogram; and
   add the selected at least one color to the first histogram.

32. The system of claim 25 wherein the histogram editing module is further configured to:
   select a color by choosing its color elements;
   add the color to the first histogram.

33. The system of claim 25 wherein the histogram editing module is further configured to:
   select at least one color from the first histogram; and
   delete the selected at least one color from the first histogram.

34. A system for manipulating a histogram comprising:
   a quantizing module configured to quantize color elements of an image file based upon a color space;
   a histogram creation module configured to generate a color space octree corresponding to the color elements, wherein leaves close together in the octree correspond to similar colors, and to create a histogram that groups like colors together by traversing the octree at the leaves; and
   a histogram editing module configured to display the histogram.

35. The system of claim 34 wherein the histogram creation module is further configured to prune the octree to remove nodes.

36. The system of claim 34 wherein the quantizing module is further configured to:
   parse color elements of an image onto the octree based upon the color space, wherein first color elements of the image are parsed onto a first level of the octree, second color elements of the image are parsed onto a second level of the octree, and third color elements of the image are parsed onto a third level of the octree.

37. The system of claim 36 wherein the color space is HSV and hue elements are parsed onto the first level, luminance elements are parsed onto the second level, and saturation elements are parsed onto the third level.

38. The system of claim 34 wherein the color space is selected from the group comprising RGB, HSV, and CIELAB.

* * * * *